United States Patent [19]

McClure et al.

[11] 4,328,703

[45] May 11, 1982

[54] THRUST MEASURING TEST STAND

[75] Inventors: John W. McClure, Houston, Tex.; George S. Hudson, Hamden, Conn.

[73] Assignee: Avco Corporation, Stratford, Conn.

[21] Appl. No.: 121,358

[22] Filed: Feb. 14, 1980

[51] Int. Cl.³ .............................................. G01L 5/13
[52] U.S. Cl. ................................................. 73/117.4
[58] Field of Search ................... 73/117.4, 141 A, 147

[56] References Cited

U.S. PATENT DOCUMENTS 3,561,280 2/1971 MacPhee et al. ............ 73/141 A X

OTHER PUBLICATIONS

Thrust Stands. Brochure of Hunter–Bristol Corp. 1957, Bristol, Pa., pp. 1, 5.
The Design of . . . Calibrators. Brochure of Wiancko Engineering Co., Pasadena, Ca., Feb. 1962, p. 15.

*Primary Examiner*—Jerry W. Myracle
*Attorney, Agent, or Firm*—Ralph D. Gelling

[57] ABSTRACT

A test stand for measuring the thrust produced by a jet engine includes a base and a floating frame having the engine connected thereto, with the floating frame being disposed in spaced, parallel relationship to said base. The base and floating frame are interconnected by a plurality of elongated support flexures, each of which is provided with a first and second elongated generally planar webs, disposed in axial alignment and with the plane of the first web being orthogonal to the plane of the second web. The flexures are disposed such that the plane of the fist web is perpendicular to the logitudinal axis of the jet engine. In operation, the thrust of the jet engine causes movement of the floating frame relative to the base thereby resulting in a corresponding bending of the flexure, with the bending being localized in the first web to facilitate its measurement. A control circuit is provided which includes a plurality of transducers that are bonded to the flat surface portion of the first web. The transducers are interconnected in a Wheatstone's bridge arrangement to produce an accurate measurement of thrust.

6 Claims, 6 Drawing Figures

FIG. 6

THRUST MEASURING TEST STAND

BACKGROUND OF THE INVENTION

The subject invention provides for a thrust measuring test stand for measuring the thrust produced by a jet engine which has been mounted thereon. The thrust measuring test stand includes a base and a floating frame disposed in parallel spaced relationship from said base. The jet engine, the thrust of which is to be measured, is mounted to the floating frame, either on top or underneath the floating frame assembly.

In accordance with the subject invention, the base and floating frame are interconnected by a plurality of elongated support flexures, each of which is provided with first and second elongated generally flat planar webs, with the plane of the first web being orthogonal to the plane of the second web. More specifically, each elongated support flexure consists of a dual I-beam construction wherein the web portion of one I-beam is disposed in orthogonal relationship to the web portion of the other I-beam. The flexures are interconnected between the base and the floating frame such that first web portion of each flexure is disposed in perpendicular relationship to the longitudinal axis of the engine. In operation, the thrust of the jet engine causes a longitudinal movement of the floating frame relative to the base. The movement of the floating frame causes a corresponding bending of the flexure, with the bending being localized in the first web portion of the flexure. More specifically, due to the new and improved dual I-beam construction of the subject flexure, bending of the flexure, which occurs parallel to the longitudinal axis of the engine, is localized in the first web portion of the flexure.

The subject invention further includes a new and improved means for measuring the bending of the web portion, with the transducer of the measuring means being bonded to the first web portion of the flexure. Since bending of the flexure in response to the thrust of the engine is localized in the area where the measuring means is placed, a relatively simple, low cost thrust measuring test stand is provided which can accurately measure the thrust produced by a jet engine.

The design of a jet engine by a manufacturer is accompanied by an estimation of the maximum thrust which will be produced by the engine under optimum operating conditions. In practice, after the construction of a jet engine, both the manufacturer and user require specific data relating to the exact thrust produced by the jet engine under varying conditions. Heretofore, the thrust of a jet engine was measured by affixing the engine on a test stand, with the test stand being supported by flexible support beams. The operation of the engine resulted in movement of the test stand and a corresponding bending of the support beams, with the bending being measured by placing a measuring device, having a plunger-type piston sensor, against the stand. The bending or movement of the stand would actuate the plunger of the calibrated measuring device, with the amount of actuation being proportion to the amount of thrust produced by the engine. A difficulty arose with this type of prior art thrust measurement since a separate calibrated measuring device must be accurately aligned with the test stand to produce accurate results. The necessity of providing highly accurate alignment equipment along with the test stand, resulted in a system which was extremely expensive to manufacture, relatively complicated to operate and of questionable accuracy.

Another difficulty experienced with test stands in the prior art was that vibrations caused by operation of the engine were transmitted to the interface surface at the measuring device. In order to reduce the effect of the vibrations, the prior art test stands were preloaded with additional weight and horizontal forces which inhibited many unwanted vibrations. However, because of the heavy preload, the support beams were required to be relatively strong, thick structures, which were expensive to manufacture, and difficult to align. In addition, measuring errors occurred when using the prior art test stands because bending of the support flexures was not always proportional to the thrust produced by the engine. More specifically, the relatively strong forces applied to the elongated support flexures in the prior art could result in a twisting of the flexure. Further, secondary forces such as a pitching moment would tend to warp the flexures. The resulting warping and twisting of the support flexures introduced errors in the measurement of the thrust.

Accordingly, it is an object of the subject invention to provide a thrust measuring stand which is accurate and which may be produced at substantially reduced manufacturing cost.

It is another object of the subject invention to provide a thrust measuring test stand which includes a new and improved support flexure which functions to localize the bending of the flexure, caused by the operation of the jet engine, in a first web portion to thereby facilitate the measurement thereof.

It is a further object of the subject invention to provide a thrust measuring test stand having new and improved support flexures which are effectively of a dual I-beam construction, with the web portions of the I-beams being disposed in orthogonal relationship to each other, and with one web of an I-beam portion being disposed perpendicular to the longitudinal axis of the engine. By this arrangement, the bending of the flexure is localized in the web portion which is perpendicular to the longitudinal axis of the engine thereby facilitating the measurement of the thrust.

It is still another object of the subject invention to provide a thrust measuring test stand which is provided with a new and improved measuring means bonded to the first web portion of the support flexure.

It is still a further object of the subject invention to provide a thrust measuring test stand having a measuring means, and a new and improved control circuit means which produces an average voltage that is proportional to the thrust produced by the engine, and fractions to cancel and eliminate unwanted secondary forces, such as engine weight.

It is still another object of the subject invention to provide a thrust measuring test stand wherein a new and improved measuring means includes a plurality of transducers bonded to the web portion of the flexures, with the resistance of the transducers varying proportionally to the bending of the webs.

It is still a further object of the subject invention to provide a new and improved thrust measuring test stand, having a floating frame and a base frame, each defined by a generally rectangular, hollow beam member, and wherein a coolant liquid is circulated in and through the hollow beam member to thereby reduce the warping effects of the high temperature produced by the jet engine.

SUMMARY OF THE INVENTION

The thrust measuring test stand of the subject invention is provided with a base portion and a floating frame disposed in parallel spaced relationship to the base. The jet engine to be tested is fixedly mounted on the floating frame. In accordance with the subject invention, at least one elongated support flexure is provided which is interconnected between the base and the floating frame and is disposed in perpendicular relationship thereto. The support flexure is generally of an axially extending, dual I-beam construction, with the respective web portions of the I-beam sections being disposed in perpendicular relationship. In addition, the flexure is positioned such that the first web is in perpendicular relationship to the longitudinal axis of the jet engine to be tested. The construction and placement of the new and improved support flexure functions to localize the bending of the flexure, which is caused by the operation of the engine, in the first web portion. More specifically, the operation of the jet engine results in the movement of the floating frame, in a direction opposite to the thrust produced by the engine. This movement of the floating frame, relative to the base, causes a corresponding bending of the support flexure. Due to the nature of the dual I-beam construction, the second web portion, which is parallel to the longitudinal axis of the engine, remains essentially rigid and unbent along its axis, such that substantially all of the bending along this axis is localized in the first web portion of the flexure. Thus, by localizing the bending of the flexure in the area of the first web, measurement of the bending is facilitated. More specifically, a measuring means may be connected to the first web of the flexure to accurately measure this bending, which is proportional to the thrust produced by the engine.

In a preferred embodiment of the subject invention, the floating frame is generally rectangular in configuration, and four support flexures are provided which are connected adjacent the opposed corners of the floating frame. Measuring means are provided which are connected to the first web portions of each of the four respective flexures. The new and improved measuring means includes two pairs of transducers, which are mounted to the opposed surfaces of the first web portions of each flexure, there being a total of four such flexures and with the resistance of each transducer varying proportionally to the bending of the flexure. The new and improved measuring means further includes a control circuit means, wherein the transducers are interconnected in a Wheatstone's bridge arrangement such that bending of the flexure, in response to the thrust of the engine, produces an average voltage which varies proportionally to the thrust. In addition, the control circuit includes means to automatically cancel extraneous secondary forces, such as those caused by the weight of the engine, from the computation of thrust.

In the preferred embodiment of the subject invention, the floating frame and the base frame are each defined by a hollow beam member which circumscribes the periphery of the rectangular frame and provides an open inner area to facilitate engine adjustments. In addition, a coolant liquid may be circulated through the hollow beam member to cool and evenly distribute the heat generated from the rear of the engine which would tend to warp the flexures or otherwise introduce errors into the testing.

These and many other objects and advantages of the subject invention will become apparent from the following detailed description when taken in conjunction with the accompanying drawings in which:

DETAILED DESCRIPTION OF THE PREFERRED EMBODIMENTS

Figure 1:
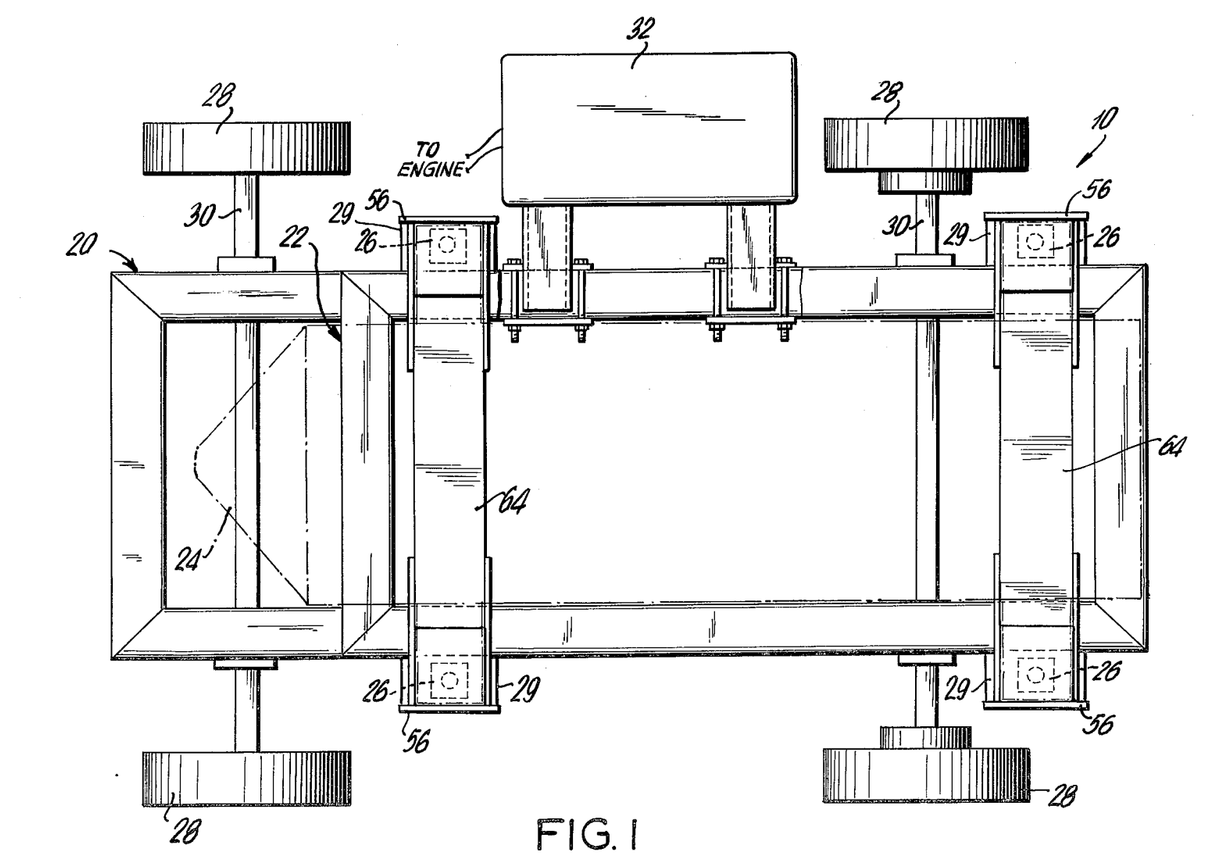
FIG. 1 is a top plan view of the thrust measuring test stand of the subject invention.
Figure 2:
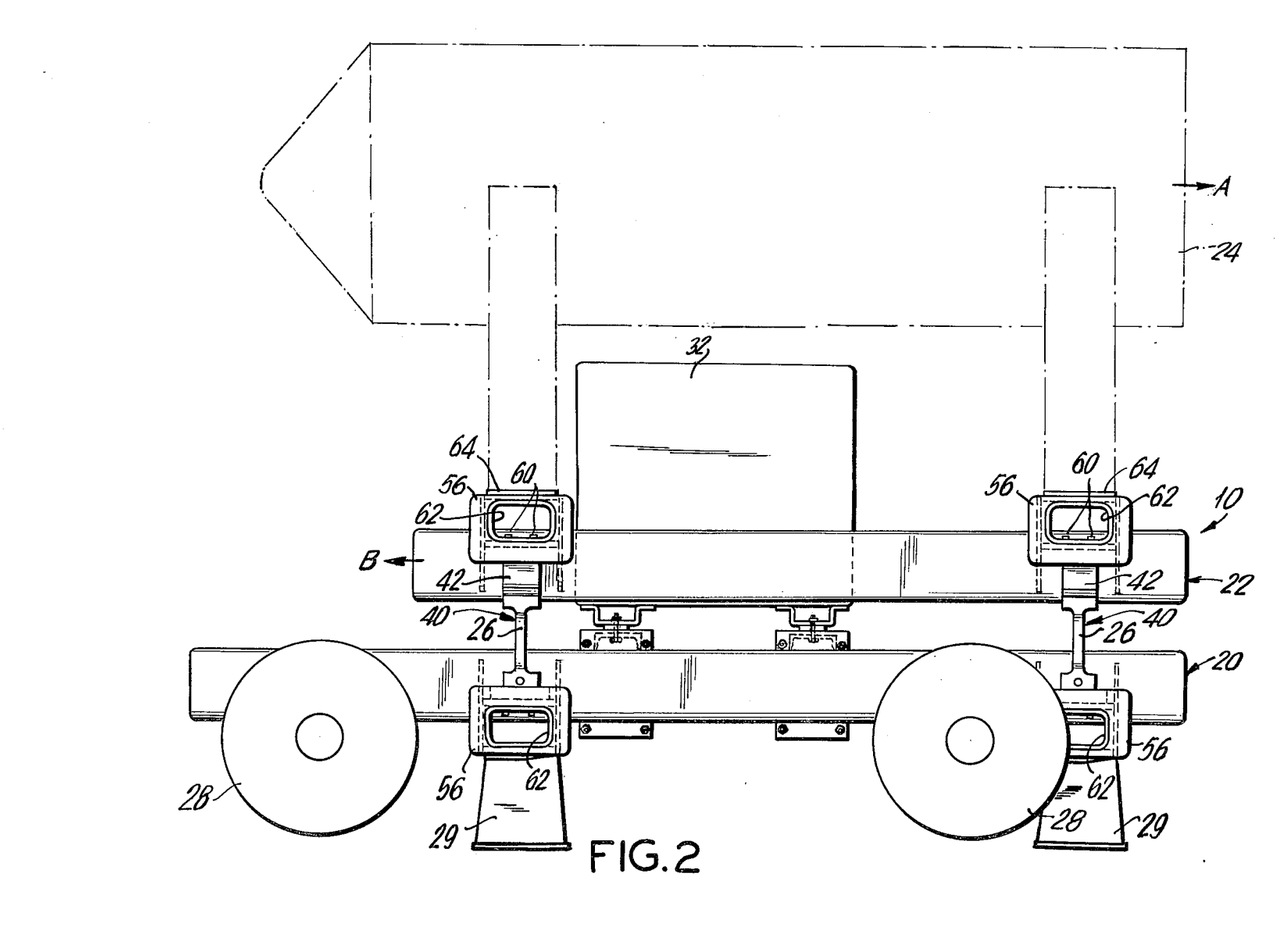
FIG. 2 is a side elevational view of the thrust measuring test stand of the subject invention.
Figure 3:
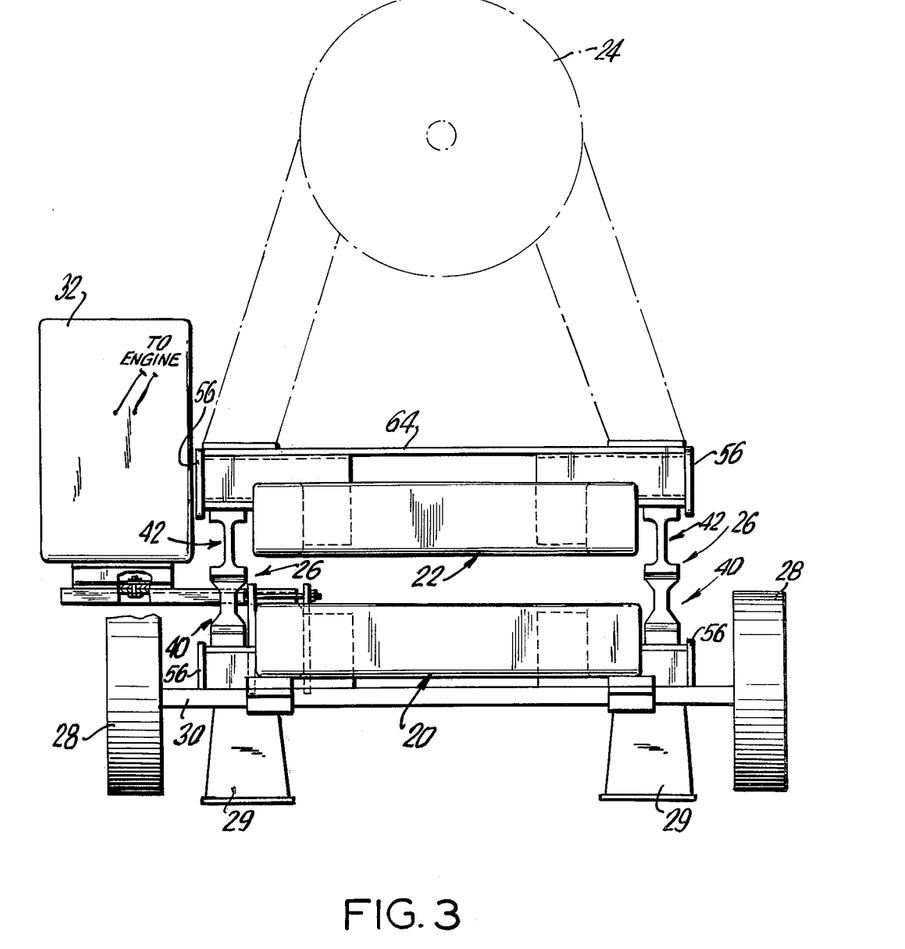
FIG. 3 is a front elevational view of the thrust measuring test stand of the subject invention.

Referring now more generally to FIGS. 1–3, a preferred embodiment of the thrust measuring test stand of the subject invention is illustrated, and is indicated by the numeral 10. Test stand 10 is provided with a generally rectangular base 20 and a floating frame 22 which is disposed in parallel spaced relationship to the base 20. A jet engine 24, indicated in phantom, is mounted to the floating frame 22. The latter is supported and spaced from the base 20 by four flexures, indicated generally by the numeral 26. The base 20 may be provided with two pairs of wheels 28 mounted on axles 30 thereby enabling the test stand 10 to be freely transported in the field. Four floor mounted stands 29 are used to secure the test stand 10 in place during a testing operation. An accessory box 32 is provided which is mounted to the base 20 and contains the fuel, oil, electrical source and water needed to operate the engine 24. The accessory box may additionally house the control circuits for determining the thrust of the engine 24. In a preferred embodiment, the fuel, oil and water lines, as well as the electrical wiring are flexibly connected between the accessory box 32 and the engine 24 and flexures 26. In operation, thrust developed by the engine in a direction indicated by arrow A causes the reaction movement of the floating frame 22 in a direction as indicated by arrow B. The longitudinal movement of the floating frame 22 causes the bending of the flexures 26. The amount which the flexures 26 bend varies proportionally with the thrust generated by the engine 24 such that a quantitative measurement of the bending of the flexures 26 can be used to measure the amount of thrust produced by the engine, as more fully described hereinafter.

Figure 4:
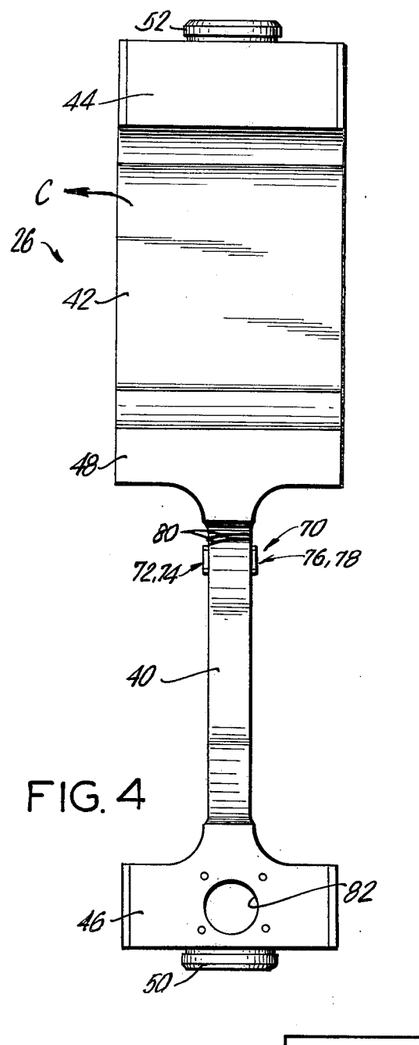
FIG. 4 is a side elevational view illustrating the support flexure of the subject invention.
Figure 5:
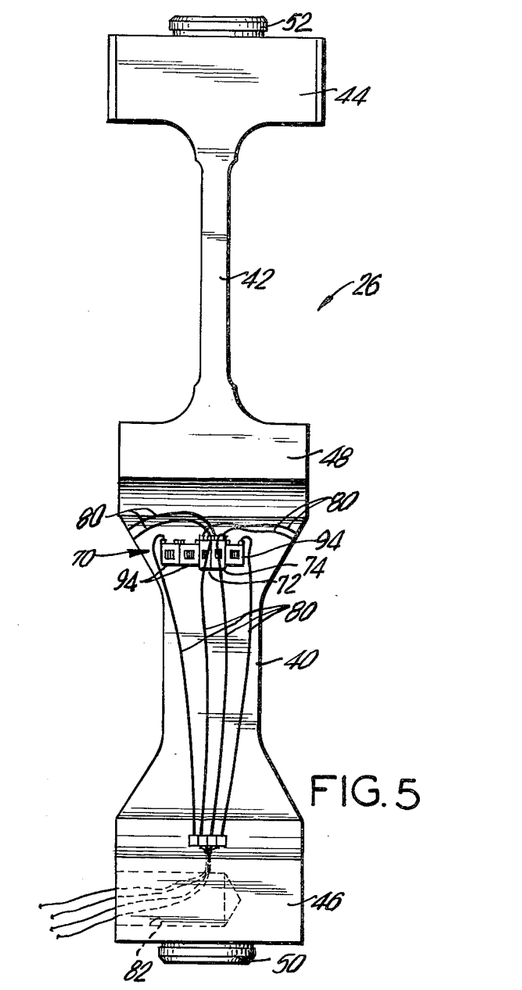
FIG. 5 is a front elevational view of the support flexure of the subject invention.

In accordance with the subject invention, the test stand 10 is provided with new and improved support flexures 26, as more particularly illustrated in FIGS. 4 and 5. Each flexure 26 is of a dual I-beam construction which includes first and second planar webs 40 and 42 arranged in axial alignment. As illustrated in the side and front elevational views in FIGS. 4 and 5, the plane of the lower web portion 40 is disposed in orthogonal relationship to the plane of the upper second web 42. Flexure 26 is additionally provided with thickened upper and lower base portions 44 and 46, and a central flange portion 48.

The new and improved flexures 26 derives structural advantages from the dual I-beam construction. More particularly, a single I-beam is highly resistant to flexing in a direction parallel to the plane of the flat planar web, even when subjected to relatively high forces. In contrast, an I-beam will readily flex in a direction perpendicular to the flat planar web portion. The support flexure 26 of the subject invention functions to localize the flexing of the beam, due to the thrust of the engine, in the first web 40. More specifically, and when viewed in conjunction with FIG. 2, the thrust of the engine, indicated by arrow A, causes the movement of the floating platform 22 relative to the base 20 in a direction indicated by arrow B. The upper second web 42, which is disposed parallel to the longitudinal axis of the engine, will remain substantially rigid under the force of the thrust of the engine. In contrast, the lower first web 40 whose planar surface is perpendicular to the thrust of the engine, will exhibit bending, which is proportional to the thrust produced by the engine. The new and improved dual I-beam construction of flexure 26 thereby tends to localize the bending of the flexure in the area of the first web 40 to facilitate the measurement thereof. Thus, and as more fully described hereinafter, measuring means may be mounted on the first web portion 40 to detect the amount of bending of the flexure 26. While the illustrated embodiment provides that the lower web 40 be disposed perpendicular to the longitudinal axis of the engine, the subject invention is not restricted to this arrangement, and may be configured such that the upper web 42 be oriented perpendicular to the longitudinal axis of the engine 24. In the latter configuration, the plane of the lower web 40, which remains in perpendicular relationship to the plane of the upper web 42, and therefore extends parallel to the longitudinal axis of the engine, would remain substantially rigid under the thrust force of the engine. In the latter arrangement, the upper web 42 would bend in an amount proportional to the thrust of the engine.

Turning now more specifically to the construction of the thrust measuring test stand 10 of the subject invention, a generally rectangular base 20 is provided which, in a preferred embodiment, is defined by a rectangular beam thereby providing an open interior area to facilitate access to the various portions of the engine. The base may be provided with a pair of axles 30 and wheels 28 such that the test stand 10 may be readily moved. A floating frame 22 is provided which is generally rectangular in configuration having a length less than the base 20 and a width of substantially similar dimensions. The floating frame 22 is defined by a hollow rectangular beam member and is disposed parallel and spaced from the base 20. During a test run, the jet engine 24 will produce a substantial amount of heat, the majority of which is expelled from the rear of the engine. However, in order to reduce any inadvertent errors which may be caused by the uneven heating of the frames, a coolant liquid may be provided to evenly distribute the heat produced by the engine to the entire floating frame 22 and base frame 20. In addition, the liquid may be refrigerated to keep the floating frame 22 and base frame 20 at a desired temperature.

In accordance with the subject invention, a plurality of new and improved flexures 26 are provided which are interconnected between the base 20 and the floating frame 22 and in perpendicular relationship thereto. Each flexure is securely mounted to both the base 20 and the floating frame 22 inasmuch as it is subjected to thrust forces of up to one-fourth of the total engine thrust when using four flexures and must resist any unwanted movements which would introduce errors into the accurate determination of the thrust force. Accordingly, and as illustrated in FIGS. 4 and 5, each flexure is provided with a pair of threaded inserts 50 and 52 disposed on the opposed ends thereof. The threaded inserts 50 and 52 are adapted to be threadably engaged in apertures (not shown) provided in tubular support flanges 56. More particularly, as illustrated in FIGS. 2 and 3, tubular support flanges 56 are provided and are connected to both the base 20 and the floating frame 22 to provide a secure mechanical connection for the flexures 26. After the threaded inserts 50 and 52 are threadably engaged in the apertures provided in the support flanges 56, the flexures are further connected thereto by a plurality of bolts 60. More particularly, bolts 60 are threadably engaged into holes (not shown) provided in the threaded inserts 50 and 52 at the opposed ends of each flexures 26. Each support flange 56 is provided with a tubular opening 62 such that the bolts 60 may be accessed and tightened to securely hold the flexure 26 in position.

As illustrated in FIG. 1, a pair of cross beams 64 are provided which are connected to the support flanges 56 of the floating frame 22. The cross beams 64 are provided to facilitate the mounting of the engine 24. The mounting of engine 24 to the test stand 10 may be by any suitable means used in the prior art. Typically, jet engine manufacturers provide hard points on the engine to facilitate the mounting of the engine such that the longitudinal axis thereof is properly aligned.

In accordance with the subject invention, the longitudinal axis of the engine 24 and hence the line of thrust of the engine, is disposed in perpendicular relationship to the first web portion 40 of the flexure 26. This configuration necessarily implies that the second web portion 42 is disposed parallel to the longitudinal axis of the engine 24. In operation, the thrust produced by the engine in a direction as indicated by arrow A, will cause the movement of the floating frame 22 in the direction as indicated by arrow B. Due to the new and improved dual I-beam construction of the flexure 26, the bending of the flexure 26 which is caused by the movement of the floating frame 22 relative to the base 20 is localized in the first web portion 40. Thus, by accurately measuring the bending of the flexure in the area of the first web 40, the calculation of the thrust produced by the engine may be both accurate and continuous.

Although the subject invention has been described with reference to a static test stand 10, it is apparent that the invention may be embodied in the airframe structure of an aircraft to form a portion of the engine mounting in order to provide an arrangement for testing the engine while on the ground or in flight. Hence, the base frame 20 would be fixedly secured to the airframe structure, while the engine is mounted on the floating frame 22, with flexures 26 interconnecting the respective frames 20 and 22.

In accordance with the subject invention, a new and improved means is provided for determining the amount of bending of the first web portion 40 of the flexure 26 and includes a means for converting this measurement into an average voltage which varies proportionally with the thrust of the engine. In addition, the new and improved control circuit means functions to cancel and eliminate unwanted extraneous secondary forces such as unevenly distributed weight, which would tend to introduce error into the thrust measurement.

The new and improved measuring means includes a plurality of transducers 70 which are bonded to the flat surface portion of first web 40 and have a resistance which varies proportionally to the bending of the first web. As illustrated in FIG. 5, a first pair of transducers 72 and 74 are mounted on the front flat surface of first web 40. Correspondingly, a second pair of transducers 76 and 78 are provided and are mounted on the opposed flat surface portion of web 40 along the same horizontal plane as the first pair transducers 72 and 74. During the operation of the engine 24, flexure 26 tends to bend in a direction as indicated by arrow C in FIG. 4. This bending tends to slightly compress first pair transducers 72, 74 while in contrast, tends to elongate (or place in tension) second pair transducers 76, 78. The characteristics of transducers 70 are such that their resistance is reduced in compression, while their resistance is increased when in tension. As discussed more fully hereinafter, when the transducers 70 are interconnected to a control circuit means, the proportionally varying resistance can be translated into an accurate measurement of the thrust produced by the engine.

The arrangement and placement of the transducers 70 may be varied in accordance with the scope of the present invention. More specifically, in a preferred embodiment where four flexures are provided, sixteen transducers may be paired, with a pair of transducers being bonded to each opposed flat surface portion of web 40. However, inasmuch as each individual transducer produces a resistance which varies with the thrust of the engine, it is possible to construct the subject invention with a single flexure and a single transducer to theoretically produce the same result. However, additional accuracy, as well as elimination of secondary forces can best be accomplished, by using additional transducers 70 which are mounted on a plurality of flexures 26.

Figure 6:
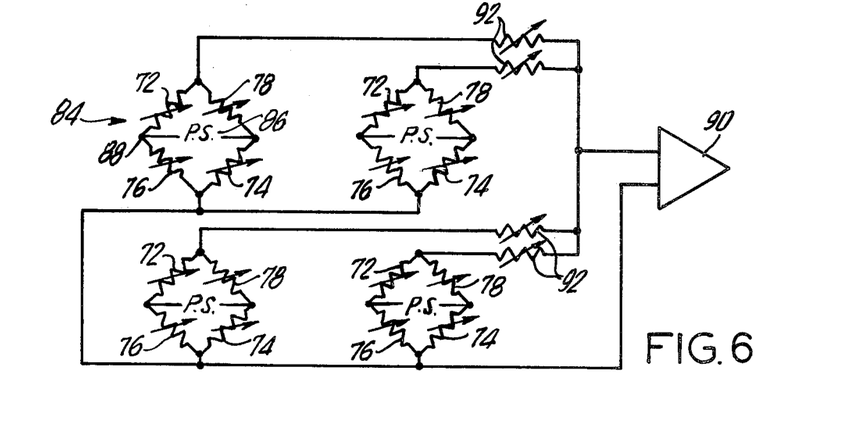
FIG. 6 is a simplified, schematic illustration of the control circuit means for the thrust measuring stand of the subject invention.

Transducers 70 are interconnected with each other and with the control circuit means via wire leads 80 which extend down the length of the flexure and emerge through an aperture 82 provided in the thickened lower portion 46 of the flexure 26. In order to increase accuracy and eliminate the introduction of secondary forces, four transducers 70 are coupled and connected in a Wheatstone's bridge arrangement as schematically illustrated in FIG. 6.

Focusing specifically on the Wheatstone's bridge arrangement indicated generally by the numeral 84, the first and second pair transducers 72, 74, 76, 78 are interconnected in a parallel-series arrangement. In a preferred embodiment, wherein four transducers are bonded to each flexure, these transducers should be interconnected in a single Wheatstone's bridge. In an alternative arrangement, wherein only two transducers 70 are bonded to each flexure, the transducers 70 on one flexure may be coupled to the transducers 70 on another flexure in a Wheatstone's bridge arrangement. While there are numerous other possible combinations of placements for the transducers 70, the proper interconnection of the transducers remains constant. More specifically, a transducer which is subject to compression must be coupled in series with a transducer which is subject to tension. In addition, the order of the transducers (i.e. compression-tension, or tension-compression) in the two opposed separate parallel paths must be different. By this arrangement, the current from the power supply 86 at point 88 may enter either a compression transducer 72, 74 or a tension transducer 76, 78. When the transducers 70 are interconnected in the above described pattern, a change in voltage is produced which varies proportionally with the thrust of the engine. In the operation of the illustrated embodiment, bending of the first web portion 40 in the direction indicated by arrow C, places first pair transducers 72, 74 in compression thereby reducing their resistance. In contrast, second pair transducers 76, 78 are placed in tension thereby increasing their resistance. As a result of being interconnected in the Wheatstone's bridge arrangement as shown at 84, a negative change in resistance of either of first pair transducers 72, 74 produces a positive change in voltage. In contrast, any increase in resistance exhibited by transducers 76, 78 will also produce a positive change in voltage. In operation, the resistance of each individual transducer 70 varies proportionally with the thrust of the engine, with the resulting voltage changes, being electronically averaged by operational amplifier 90. In theory, all the transducers are identical, and produce equal absolute resistance changes and thereby equal voltage changes. In practice, the slight random variations which may occur, are effectively cancelled by first summing the voltage changes, and thereafter dividing the sum by four to obtain an average voltage change.

The accuracy of the subject invention is further enhanced by placing a four transducer network on each of the four flexures 26. As illustrated in FIG. 6, each group of transducers 70 are interconnected in the Wheatstone's bridge arrangement, with each network being connected to operational amplifier 90. In this preferred embodiment, all sixteen transducers 70 produce a positive voltage change which is averaged. The average voltage change obtained yields a highly accurate indication of the thrust produced by the engine. More specifically, slight random variations in the resistance of the transducers 70 are effectively cancelled, by averaging the test data of sixteen separate transducers.

Another distinct and important advantage which results from the interconnection of the transducers 70 of the subject invention is that secondary forces to which the flexures 26 are subject are also effectively cancelled. For example, neither the addition of weight on the floating frame 22, nor a vertical force produced by the engine will result in a voltage change. In the former case, any downward force on the flexures 26, resulting from a weight being placed on the floating frame 22, will compress all of the transducers 70 on the flexure. This compression will cause a corresponding reduction of resistance in each transducer 70. As a result of the interconnection of the transducers 70 in the Wheatstone's bridge arrangement, a reduction in resistance of first pair transducers 72, 74 will produce a positive change in voltage, as noted above. However, a decrease in resistance in the second pair transducers 76, 78 will produce a corresponding and equal negative voltage change. Thus, since the circuit averages the voltage changes, no change will be detected. In the latter case, where a vertical force is applied, all of the transducers 70 will be placed in tension causing each to increase in resistance. In a reverse of the above described situation, the increase in resistance of transducers 72, 74 will produce a negative voltage change while the increase in resistance of transducers 76, 78 will produce a positive voltage change, the average change being zero. Thus, unwanted secondary forces, which are not directed along the thrust axis of the engine, are eliminated from the measurement of the thrust.

As illustrated in FIG. 6, a plurality of trimming resistors 92 are provided to allow for the calibration of each individual Wheatstone's bridge arrangement during set up. To additionally provide for accurate thrust measurements, temperature compensation modules 94 may be mounted on the web 40 of the flexure 26 in close proximity to the transducers 70 for monitoring any temperature variation. The temperature compensation modules 94 may be interconnected with the control circuit means to reduce computational errors due to heating.

In the preferred embodiment, each of the four flexures 26 are provided with four transducers which are bonded to the flexures along a common, horizontal plane, and spaced uniformly from the base 20 of the stand 10. By this arrangement, the thrust of the engine is effectively measured along this entire plane. Further, each group of four transducers 70 are interconnected and calibrated as a group. Thus, replacement of a single flexure 26 necessitates the calibration of the transducers on that flexure only. More specifically, the cancellation of secondary forces by each Wheatstone's bridge arrangement occurs independently from any of the other three. In fact, after the engine is mounted and the trimming resistors 92 are set, the calibration of the measuring means can be tested by placing a weight anywhere on the floating frame 22. While the weight may cause each flexure 26 to be compressed to a different extent, the compression of the four transducers 70 on any one flexure 26 will be equal and therefore should produce no change in average voltage.

In summary, there has been provided a new and improved thrust measuring test stand 10 which includes a base 20 and a floating frame 22. A plurality of support flexures 26 are provided which are interconnected between the base 20 and the floating frame 22 and are disposed perpendicular thereto. The new and improved flexures are of a dual I-beam construction, wherein the first web portion 40 thereof is in perpendicular relationship to the second web portion 42. The flexures 26 are securely mounted to the base 20 and the frame 22 in such a manner that the plane of the first web 40 is disposed in perpendicular relationship to the longitudinal axis of the engine 24. In operation, the thrust of the engine causes the floating frame 22 to move relative to the base 20. This movement causes the bending of the flexure 26, with the new and improved construction of the flexure functioning to localize the bending in the area of the first web 40. A new and improved means for measuring this bending is provided. More specifically, transducers are provided which are bonded to the flat surface portions of the first web, with the resistance of the transducers varying with the bending of the flexure 26. The transducers are interconnected in a control circuit means which includes a Wheatstone's bridge, for producing an average voltage which varies proportionally with the thrust of the engine. This voltage may be multiplied by a constant factor which includes the rigidity of the flexures, as well as the temperature and other conditions, to yield a numerical measurement of thrust. The new and improved control circuit means additionally functions to cancel any secondary forces imposed on the flexures other than the thrust from the engine.

Although the subject invention has been described by reference to preferred embodiments, it is apparent that other modifications could be devised by those skilled in the art that would fall within the scope and spirit of the present invention as defined by the appended claims.

What is claimed is:

1. A test stand for measuring the thrust produced by a jet engine comprising:
   a rectangular base;
   a rectangular floating frame disposed in parallel spaced relationship to the base, with the engine being mounted to said floating frame;
   a set of four elongated support flexures interconnecting the base and the floating frame adjacent the corners thereof and disposed perpendicular thereto, each of said support flexures including first and second elongated generally planar webs, with the plane of said first web being orthogonal to the plane of said second web and with said first web being perpendicular to the longitudinal axis of the engine, whereby the operation of the jet engine causes movement of the floating frame relative to the base and parallel to the longitudinal axis of the engine thereby resulting in a corresponding bending of the flexures, localized in said first web portion thereof for facilitating the measurement of said bending;
   a first pair of transducers bonded to the planar surface of the first web of each flexure, said first pair of transducers constructed to generate a signal proportional to the bending of the first web;
   a second pair of transducers bonded to the opposing planar surface of the first web of each flexure, said second pair of transducers constructed to generate a signal proportional to the bending of the first web; and
   control means connected to the transducers of each flexure to receive the signals therefrom and to generate a signal indicative of the thrust of the engine.

2. A test stand as recited in claim 1 wherein said transducers are interconnected in a Wheatstone's bridge arrangement, with said Wheatstone's bridge functioning to produce a voltage which is proportional to the thrust produced by said engine.

3. A test stand as recited in claim 1 wherein all of said transducers are disposed in a plane which is parallel and spaced from said base.

4. A test stand as recited in claim 1 wherein said beam member is hollow thereby defining a channel, said channel being filled with a coolant liquid, and with said test stand further including a cooling means, said cooling means for circulating and cooling said liquid in said channel thereby minimizing the warping of said flexures due to the heat produced by said engine.

5. A test stand as recited in claim 4 wherein said base comprises a hollow, generally rectangular base beam, with said hollow base beam being in communication with said cooling means for providing coolant liquid to said base beam.

6. A test stand as recited in claim 1 wherein said flexure further includes a pair of threaded inserts disposed on the opposed ends thereof, said threaded inserts adapted to be screwed into threaded female apertures provided in said base and said floating frame, and wherein the connection between said flexure and said base and floating frame further includes a plurality of bolts, with the combination of said threaded inserts and bolts providing a secure stable connection.

* * * * *

UNITED STATES PATENT AND TRADEMARK OFFICE
CERTIFICATE OF CORRECTION

PATENT NO. : 4,328,703
DATED      : May 11, 1982
INVENTOR(S) : John W. McClure and George S. Hudson It is certified that error appears in the above-identified patent and that said Letters Patent are hereby corrected as shown below:

Abstract, line 11, please delete the word "fist" and insert the word "first" in its place.

Column 2, line 53, please delete the word "fractions" and insert the word "functions" in its place.

Signed and Sealed this

Tenth Day of August 1982

[SEAL]

Attest:

GERALD J. MOSSINGHOFF

Attesting Officer

Commissioner of Patents and Trademarks